Patented Dec. 4, 1945

2,390,074

UNITED STATES PATENT OFFICE 2,390,074

PROTEIN PRODUCT AND PROCESS

Edwin J. Cohn, Cambridge, Mass., assignor to Research Corporation, New York, N. Y., a corporation of New York No Drawing. Application February 9, 1942,
Serial No. 430,075

22 Claims. (Cl. 260—122)

This invention relates to the fractionation of proteins and has for its object the provision of improvements in methods for this purpose and of novel protein products.

A variety of highly useful proteins is contained, for example, in blood. Some of these proteins are found in the red blood cells, others in solution in the plasma or serum. My invention is directed to the separation of proteins from blood or other fluids or animal or vegetable extracts; such as milk, liver extract, corn extract, etc.

In my co-pending application Ser. No. 371,401, filed December 23, 1940, of which the present application is a continuation in part, I have disclosed and claimed processes for fractionating proteins, as well as novel protein products. These processes involve control of certain factors affecting the solubility of proteins and variation of one or more of these factors. The separation of the proteins is carried out in a liquid medium and involves gradual diffusion through a semipermeable membrane of a precipitant or precipitants, such as alcohol, at low temperatures, into a liquid solution of the proteins to be separated. The temperature, the hydrogen ion concentration, the ionic strength, the nature and the concentration of the precipitant are all carefully controlled.

Successive protein fractions may be precipitated, for example from bovine plasma, by the addition thereto of varying amounts of neutral salts such as phosphates and sulfates, by organic molecules such as ethanol, or some other precipitant such as methanol, butanol, acetone, a suitable member of the glycol series, dioxane, etc., or a mixture of precipitants, such as alcohols and salts or alcohols and ethers. Further fractions may be obtained by variation in the temperature, the hydrogen ion concentration and/or the concentration and nature of the salt which is present.

The plasma may be obtained by first separating the corpuscles from the blood by centrifugation, the fibrinogen being prevented from clotting by the addition of citrates or like agents.

The protein fractions which are precipitated may, for example, comprise largely fibrinogen, or globulin, or albumin, or mixtures thereof, depending on the selection of the combination of factors affecting solubility of the protein.

The fibrinogen separates from the plasma readily when the alcohol or other precipitant is added to it through a capillary or when the plasma is sprayed into the alcohol, precautions being taken to achieve thorough and instantaneous mixing under conditions such that denaturation of the protein shall be at a minimum. The fibrinogen derived from human plasma will clot when the other components to blood coagulation are added to it and can thus be used as a therapeutic agent. Fibrinogen also forms plastics which are thermosetting, the properties of which are described in more detail in a co-pending application of John D. Ferry, Ser. No. 430,077, filed February 9, 1942.

The globulins are more labile than the fibrinogen or the albumins, and certain of the properties of some of these, such as those in normal pooled sera or in convalescent sera, will not in general be retained unless the greatest precautions are taken in their purification. Thus, although one of the globulins, prothrombin, a factor in the coagulation process referred to above, appears to be stable only when precipitated with particular precautions, other globulin components such as those of complement are even more labile.

The albumin proteins are of particular interest, as in the treatment of shock in human beings by intravenous injection of solutions of albumin obtained from the blood of man or of domestic animals such as the cow, sheep, horse, pig, etc.

Serum albumin is isoelectric near pH 4.8. This is true at least for the albumin of human, horse and bovine serum or plasma. Since the pH of the blood is maintained near 7.4, the albumins in the blood are far from the isoelectric point, are combined with more base per gram than are the globulins and therefore would have a greater electrophoretic mobility than the globulins even were they of the same molecular weight. The molecular weight of most alubumins is in the neighborhood of 70,000 or approximately half that of most of the globulins, and this also would lead to greater electrophoretic mobilities, as well as to greater osmotic pressures per gram of protein. Although albumins have a greater net charge per gram at neutral reactions than the globulins, as well as a greater number of charged groups in the isoelectric condition, these are arranged with far greater symmetry. As a result, albumins have electric moments smaller than those of the globulins, and, in fact, of most if not all other proteins.

The conditions selected for the fractionation depend upon the solubilities of the various protein components of the system and are determined by the five variables: temperature, pH, ionic strength; concentration of precipitant and concentration of the protein components. The latter factor is of most importance when the concentration of the various proteins in the system is high and diminishes in importance in dilute protein solutions. These effects of protein concentration often protect labile proteins from denaturation. The other four variables are important under all conditions and must always be under control if reproducible separations are to be carried out in protein systems. In sufficiently dilute protein solutions they alone suffice to define the separations. In concentrated solutions the influence of one protein upon another, depending either upon salt formation or upon the interaction between dipolar ions, will have a secondary influence on the separations. In the case of salt formation, either an increase or decrease in solubility may result. In the case of interactions between proteins as dipolar ions near their isoelectric points, the influence of one protein upon another depends upon the electric moments of the proteins and will have an additional influence comparable to that of the ionic strength of the electrolytes.

The conditions for precipitating successive protein fractions are advantageously so selected as to alternate the precipitation of the broadest possible pure fraction with the precipitation of the narrowest possible impure fraction. Application of this principle gives maximum yields of pure protein products.

The volume fractions of ethanol given are those of the mixtures at 25° C. The pH and ionic strength values in ethanol-water mixtures are taken as those which would be obtained if the same concentration of salts were dissolved in pure water at 25° C. This convention is used because of the uncertainty involved in any definition of these quantities in the ethanol-water mixtures. The pH of the desired protein fractions is taken as that measured with a glass electrode for aqueous solutions of about 1% protein concentration.

The separations that I have made are not empirically determined but were chosen with the use of the ultracentrifuge to reveal the size and of electrophoresis measurements to record the charge, of the proteins, so as to yield products which should approach homogeneity both with respect to size and net charge, as stated in my aforesaid co-pending application Ser. No. 371,401.

The fibrinogen is first precipitated from the plasma with ethanol at a volume concentration of 10% as the precipitant, at neutral reaction, the temperature being below 0° C. and close to the freezing point of the solution (−3° C.).

The gamma globulins, so-called because of their characteristic electrophoretic mobility, are removed by increasing the ethanol concentration to 25%, the temperature being lowered to −5° C.

The alpha and beta globulins are next separated by bringing the pH to 5.5–6.0 and the alcohol to 40% by volume, the temperature remaining at −5° C.

The albumin remaining in solution under these conditions is largely precipitated from serum or plasma at pH 4.4–4.8 or by lowering the temperature to −15° C. Albumin, both human and bovine, has been prepared by this method and is pure both electrophoretically and in the ultracentrifuge, and there is practically no limit to the amount of this material that can readily be made available.

This method of low temperature alcohol-water fractionation leads to crystallization of albumin, where prior methods have not accomplished this. Such crystallization can be accomplished from plasma which has been contaminated or from haemolyzed plasma, thus making it possible to obtain a pure albumin product even from contaminated sources.

For certain purposes, it may be convenient to separate a variety of proteins from the plasma simultaneously. For example, with 25% ethanol at a temperature of −5° C., the pH remaining unadjusted, fibrinogen and gamma globulins are precipitated together. The protein product so obtained may be used in the manufacture of plastic compositions.

The solubility of each protein in human or in animal plasma will be minimal in the neighborhood of its isoelectric point. The separation of globulins or of casein from water by the addition of sufficient acid or alkali to bring the protein to its isoelectric point illustrates the importance of pH.

Many proteins, notably albumins, are soluble in water, even at their isoelectric points. These may be precipitated either near their isoelectric points or in a pH region not too far distant from their isoelectric points, by salt precipitation or by the addition of an organic precipitant, such as an alcohol, acetone, methanol, butanol, dioxane, a suitable member of the glycol series, etc. The amount of such precipitant necessary will in general be minimal at or near the isoelectric point of the protein. Increases in temperature will have the effect of increasing solubility in the case of proteins uncombined with acid or base near their isoelectric points. Organic solvents will in general have a greater precipitating action on proteins the lower the temperature. Sufficiently concentrated neutral salts such as phosphates and sulfates are often of the reverse effect, the protein solubility decreasing with increasing temperature.

In the case of neutral salts part of the precipitating action is comparable to that of the organic molecule, but part of the salt action gives rise to an increase in the solubility with increase in the concentration of ions (ionic strength). This is the influence of the ionic strength which must be taken into account also as an important variable when organic solvents are used as protein precipitants. Thus in the separation of the albumins from the globulins in plasma the control not only of the concentration and of the organic solvent but of the temperature, the pH and the ionic strength, is essential for the satisfactory separation and for the crystallization of the albumin.

A convenient method for controlling both pH and ionic strength with the same reagent is in the use of buffer solutions. Thus phosphate or acetate buffers of fixed pH and ionic strength have been used for this purpose under a variety of conditions.

The influence of the four variables noted above may be illustrated as follows:

(1) If the alcohol concentration of the plasma solution is brought to 40% by volume at room temperature, the fibrinogen and gamma globulins would be precipitated and in part denatured, but the alpha and beta globulins and the albumin would not be completely precipitated from the plasma.

(2) Decrease in temperature to −5° will very much diminish denaturation, will increase the precipitation of the globulins, but will still not completely precipitate the alpha and beta globulins, whose isoelectric points lie between pH 5 and 6.

(3) If the alcohol concentration is increased, or if the temperature is diminished, or if these two factors are retained constant and the pH is varied by addition of acid or buffer to bring the pH close to 5.5, the precipitation of large parts of the alpha and beta globulins is achieved.

(4) The extent of this precipitation will still depend, however, upon the ionic strength, increase in ionic strength increasing the solubility not only of the globulins but of the albumin. The amount of this effect will differ, for the globulins and the albumins, and since the globulins are far less soluble in 40% ethanol throughout this pH range an ionic strength of 0.05 has been used to increase the solubility of the albumin sufficiently without increasing the solubility of the globulin to the extent where separation is unsatisfactory.

At this pH, alcohol concentration, ionic strength and temperature, albumin is sufficiently soluble to be almost quantitatively extracted from the precipitate if these proteins are at approximately one quarter of the concentration that they would have had in the original plasma. Thus the albumin concentration is approximately 10 grams/liter, while the globulin soluble under the same conditions never exceeds one half gram/liter and if the separation is carefully carried out is often lower than 0.10 gram.

As a further example of the influence of the pH at constant ionic strength, I may then precipitate albumin at constant ionic strength by bringing the pH close to the isoelectric point of the albumin, namely pH 4.7, temperature and alcohol concentration being maintained constant. In order not to expose the albumin to even a local excess of acid, I achieve this precipitation by the addition of an acetate buffer of pH 4.2, the ionic strength being changed from 0.05 to 0.06, while the pH is changed from 5.5 to 4.7.

In adding increasing amounts of alcohol and in varying the temperature for the precipitation of successive protein fractions, the temperature and the percentage of alcohol may be so correlated that the temperature used is just above the freezing point of the solution at the percentage of alcohol present.

The fibrinogen fraction, when redissolved, gives a solution which exhibits double refraction of flow. The fibrinogen consists of molecules which sediment in the ultracentrifuge in 0.2 molal potassium chloride with a velocity constant of 7.0 to $7.9 \times 10^{-13}$, migrate in the electrophoresis apparatus at 0° C. in a phosphate buffer solution of ionic strength 0.2 and pH 7.7 with a mobility of 1.8 to $2.3 \times 10^{-5}$, are rod-shaped, and thus yield very viscous solutions. This product has the property of coagulating to form the clot characteristic of the blood clot in the presence of calcium and prothrombin. Prothrombin is a constituent of another protein fraction of plasma.

One globulin fraction has the property of polymerizing to form aggregates of varying molecular weight. This protein generally has a sedimentation constant in the ultracentrifuge of about $s=18 \times 10^{-13}$ or $s=12 \times 10^{-13}$; and its molecules are also rod-shaped and reveal double refraction of flow.

Although the proteins that separate from 15% ethanol when the temperature is shifted from 0° to −5° C. and the further precipitate that separates when the ethanol concentration is increased to 20% or 22% ethanol at −5° C. consist of a number of different chemical individuals, some of isoelectric point near 7, others of more acid isoelectric points, some near 6, some euglobulin and some pseudoglobulin, the fraction as a whole appears to be very uniform with respect to electrophoretic mobility, as judged in phosphate buffers of ionic strength 0.2 and pH 7.7, the mobility constant having the value 0.8 to $2.2 \times 10^{-5}$ cm.$^2$ per second at 0° C. The size of the molecules in this fraction is also constant with the exception of a small amount of the high molecular weight component of sedimentation constant 12 or $18 \times 10^{-13}$, the sedimentation constant of the rest of the fraction being about 5.9 to $6.7 \times 10^{-13}$ in 0.2 molal potassium chloride. This fraction soluble in salt solutions but in large part precipitable and separable into its various components by dialysis at varying pH, has been prepared as a copious, white, odorless precipitate. It is less soluble and more viscous than the albumin fractions and of very low electrical net charge.

As contrasted with the protein fractions made up of asymmetric molecules of high viscosity, which are precipitated by the lower concentrations of ethanol mixed with water in neutral solution, the fraction separated at acid reactions (near pH 5) from 40% ethanol at −5° C. consists almost completely of albumin of sedimentation constant in 0.2 molal potassium chloride of 4.0 to $4.4 \times 10^{-13}$ and of electrophoretic mobility at 0° C. in phosphate buffer of ionic strength 0.2 and pH 7.7 of 4.7 to $6.0 \times 10^{-5}$ the molecules being far more nearly spherical in shape and far more soluble, dissolving readily in water to form a limpid 20% solution of low viscosity.

In an alternate procedure, any desired protein fraction or group of fractions may be obtained by extraction from a solid mixture. Thus I may dry any mixture of these proteins, obtained by any of the procedures previously mentioned. I may then obtain the albumin fraction, for example, from this dried plasma by extraction under conditions such that only the albumins are soluble, the other proteins being insoluble. The albumin can then be separated by treating the albumin solution in a manner similar to that described previously. The set of equilibrium conditions at which extraction of any desired fraction from the solid mixture is accomplished may be selected at will by the choice of proper pH, temperature, ionic strength and alcohol concentration, and the solution thus obtained may be treated for the further subdivision of fractions contained therein in the manner previously discussed.

In addition, successive extractions may be made from the dry mixture of proteins, with different solvents and under different temperature, ionic and pH conditions.

Some protein precipitants, such as alcohol, have a tendency to denature many proteins with which they come in contact, the danger of denaturation increasing with concentration of the alcohol and increase in temperature. For many proteins, it has been found advisable to exercise considerable care in mixing the precipitant with the plasma or other protein solution in order to avoid denaturation of the protein. For these, the procedures disclosed in my co-pending application Ser. No. 371,401 are to be recommended.

In these procedures the precipitant (e. g., ethanol) is added by diffusion through a semi-permeable membrane. While maintaining the plasma at a low temperature, for example at 0° C., I may suspend in it a sac of Cellophane which contains a solution of ethanol and also other ingredients as herein indicated. Assuming that the first protein fraction is to be taken at 10% ethanol, the amount of ethanol in the solution within the semi-permeable membrane will be so calculated with regard to the total volume of liquid both inside and outside the membrane that, when equilibrium is reached, the plasma will contain exactly 10% alcohol.

It is often convenient to precool the alcohol or other reagent, below the temperature of the plasma, so that the temperature of the mixture at equilibrium will be close to the freezing point. This is an additional precaution against denaturation.

Instead of placing the precipitant within the semi-permeable membrane and suspending it in the plasma, the plasma may be confined within the membrane and suspended in a bath of the precipitant. In either case, stirring of the plasma is advisable and is usually necessary, and if the plasma is placed within the membrane, stirring of the bath and recirculation by pumping of the precipitant is also recommended. The purpose of the stirring is to prevent undesirably high concentration of the precipitant at the interface between the plasma and the precipitant.

Procedures involving the use of a semi-permeable membrane are useful not only for the addition of precipitants, but also for the addition of any reagent for modifying or purifying proteins, if such reagent threatens to denature the protein. For example, acid chlorides or acid anhydrides, which combine with the amino and phenolic hydroxyl groups of proteins, iodine which forms iodo proteins, or pyridine or other bases which modify proteins but which tend to cause denaturation, may be added through a semi-permeable membrane in order to avoid denaturation of the proteins.

Suitable large-scale equipment, in which Cellophane sheets separate the plasma from the precipitant, will generally be found convenient in production on a commercial scale.

Instead of Cellophane, collodion or sausage casings, or the like may be used as the semi-permeable membrane. However, collodion cannot be used when alcohol is the precipitant, since it is soluble in alcohol.

Some proteins, however, will be found to have a much greater resistance to denaturation by alcohol. Albumins, for example, as indicated above, have this property. When the desired product is a protein of this character, it is possible to use procedures which would not be suitable in the production of other and less stable proteins such as, for example, many globulins. The precipitant (e. g., ethanol) may in the case of these more stable proteins, such as albumin and fibrinogen, be added directly to the albumin solution without the use of a semi-permeable membrane. It is, in fact, possible to purify albumin of certain other protein impurities, such as certain globulins, by permitting the globulins to denature in 15 to 20% ethanol at pH 4.8 at temperatures between 0° C. and room temperature, separating the precipitated, denatured protein impurities and leaving the purified albumin in solution. This albumin may be precipitated in crystalline form, under the proper conditions as hereinafter described.

When the stability of the desired protein product permits addition of the alcohol without the use of a semipermeable membrane, a number of procedures for such addition may be used. Thus fibrinogen has been precipitated from plasma by spraying the plasma into ethanol-water mixtures, or vice versa. A flowing junction has also been employed for this addition, by supplying ethanol-water mixtures through one end of the top of a T-shaped tube, and plasma through the other end of the top. The two solutions are thoroughly mixed in this tube, and pass together down the stream of the T. Alcohol has also been added by forcing ethanol-water mixtures, or in some cases pure ethanol, through a tube of small diameter (e. g. of capillary size or larger) or a sintered glass plate, into the protein solution, with stirring. The precautions against denaturation necessary in any of these additions depend upon the stability of the desired protein product or products. Very labile proteins can be obtained in an undenatured state by careful avoidance of any local excess of alcohol concentration. The rate of denaturation of proteins by local excess of alcohol increases greatly with increasing temperature.

The method of addition of the precipitant to the protein, as well as the nature of the protein, will determine the degree of denaturation as well as the state of subdivision of the precipitate; the latter is of great importance in the processing of proteins on a commercial scale.

The stability of the albumin is such that I find it sufficient to add the buffer in many of the above processes through a capillary with stirring without resorting to the use of a semipermeable membrane. Since protein precipitates tend to be either very finely divided or sticky, they thus present a problem in obtaining a precipitate which can be satisfactorily collected. Rapid addition of the precipitant, as by the above or similar methods, or even by pouring it into the albumin solution, results in the formation of coarser protein precipitates, which are easier to handle.

Precipitated proteins may be dried by freezing the wet precipitate as with liquid air or solid carbon dioxide, then subjecting the solid frozen mass to a vacuum, whereby the solvent is removed by vaporization and the protein is obtained in the form of a dry powder. Due to the relatively much greater stability of albumin, however, it has been found possible to dry albumin and other more stable proteins under vacuum at room temperature or by passing dry gases over the wet precipitates, or by removing the water by organic solvents using conventional methods.

The albumin precipitate is a colorless white powder, free of reducing substances. When sufficiently purified it readily dissolves in water, yielding clear solutions even at concentrations as great as 70% protein by volume. In fact, it is apparently completely miscible with water. No precipitate appears in concentrated solutions even after a considerable period of time. Thus 25% solutions have been maintained at 37° C. for over two months without clouding up and at 45° C. for over a month. Human albumin solutions which have been kept for these lengths of time under these conditions have been injected into man as transfusion media without giving any untoward reactions. Albumin purified in this way appears to be stable for considerable periods of time even in 20% ethanol at room temperature.

Indeed, the albumin is so stable that instead of concentrating it by isoelectric precipitation from 40% ethanol, it may be concentrated by low temperature vacuum distillation even under conditions such that the globulins would be denatured. This unexpected discovery of the stability of the albumin even in ethanol-water mixtures at temperatures above zero degrees C. thus has simplified the methods for its purification and concentration.

Even bovine serum albumin purified by my process, which takes advantage of the stability of albumin being greater than that of the globulins, can be crystallized under certain conditions. I may crystallize the albumin by redissolving the previously precipitated albumin in 40% ethanol at 0° C. and pH 5.5–6.0, using an ionic strength greater than was previously employed so that the solubility of the albumin solution shall be far greater than before. If the ionic strength of the acetate buffer is 0.3, I can obtain a 20% solution of the albumin component in 40% ethanol at pH 5.5 at 0° C. If the temperature is −5° C. and the alcohol is maintained at 40% under a pH of 5.5–6.0, the ionic strength of the acetate buffer must be higher, in the neighborhood of 0.5. Upon standing, crystals separate from such solutions. Were the ionic strength or temperature higher, these would be dissolved. At a lower alcohol concentration (say 15%) at this temperature and pH, part at least of the crystals could be recrystallized if the ionic strength were lower than 0.01. The carbohydrate content of such crystals will be less than 0.1%.

It should be remembered that when the albumins are separated from the globulins at pH 5.5–6.0, temperature −5° C. and alcoholic concentration 40%, the ionic strength is as low as 0.05 and the albumin is present in the mother liquor to an extent less than 1%. By increasing the ionic strength ten-fold, one may produce a far greater increase in the solubility of the proteins, the logarithm of the solubility rather than the solubility being a function of the ionic strength in ethanol-water mixtures. It is from these highly concentrated protein solutions that crystallization takes place with the greatest ease.

By successively recrystallizing at lower ionic strengths and lower alcoholic concentrations, I may remove impurities which have different solubilities under these different conditions.

If the same conditions of temperature, pH and alcohol concentration are employed, lower ionic strength should be used in crystallizing human than bovine albumin. Thus I have found that at 40% ethanol at −5° and pH 5.5–6.0, an ionic strength of 0.2 will suffice. If the crystals formed under these conditions be dissolved in a minimal quantity of water and 40% ethanol be added to the solution until turbidity is reached, crystals will again form, crystallization this time taking place at a lower alcoholic concentration and ionic strength. This process I may repeat; each time crystallizing from a lower ionic strength and lower alcoholic concentration.

It is also possible to crystallize from the mother liquors of each of these crystalline masses by adjusting the pH to a slightly more acid reaction or by lowering the temperature. This I also sometimes find convenient, although it is generally more convenient to combine the mother liquors, precipitate the albumin at its iso-electric point by the method previously described, collect the precipitate by filtration or centrifugation, and dissolve the precipitate at the higher ionic strength in 40% ethanol. The process of recrystallization must then be carried out as described above.

The particular set of conditions selected for the precipitation or extraction of any protein fraction will depend upon the protein or proteins desired for the purpose in mind. Those conditions given in the foregoing specification have been by way of example. As has been indicated, many other sets of conditions are possible, by which different protein fractions may be obtained, in varying degrees of purity.

Having thus described my invention, I claim:

1. A method of fractionating proteins by precipitation from a solution containing a plurality of protein fractions, said solution having a pH above the iso-electric point of the fraction desired to be precipitated, which comprises lowering the pH of the solution to bring the same to approximately the iso-electric point of the desired fraction to be precipitated, bringing the ionic strength of the solution to between 0.01 and 0.2, lowering the temperature of the solution to between approximately 0° C. and the freezing point of the solution, adding an organic precipitant for protein to the protein solution, the amount of the precipitant added being such as to cause precipitation of the desired fraction only from the protein solution at the said temperature, and separating the precipitate from the solution.

2. A method of fractionating proteins by precipitation from a solution containing a plurality of protein fractions, which method comprises bringing the pH of the solution to approximately the iso-electric point of the desired protein fraction to be precipitated, bringing the ionic strength of the solution to between 0.01 and 0.2, lowering the temperature of the solution to between approximately 0° C. and the freezing point of the solution, adding an organic precipitant for protein to the protein solution, the amount of the precipitant added, the pH, the ionic strength and the temperature being such as to cause precipitation of only the desired fraction from the protein solution, and separating the precipitate from the solution.

3. The method of claim 2 in which the organic precipitant is alcohol.

4. The method of claim 2 in which the organic precipitant is acetone.

5. The method of claim 2 in which the organic precipitant is dioxane.

6. In a method for fractionating proteins, the steps which comprise mixing with a solution of proteins an organic precipitant for protein adjusting the temperature between 0 and −15° C., the amount of precipitant between 10% and 40%, the pH between 4.4 and 7 and the ionic strength between 0.05 and 0.2, and separating from the resulting liquid system a protein precipitate which is insoluble therein.

7. In a method for fractionating proteins, the steps which comprise mixing with a solution of proteins an organic precipitant for protein, adjusting and maintaining the temperature of the protein solution above the freezing point thereof but not above 0° C., the amount of said precipitant between 10% and 40% of the solution, the pH between 4.4 and 7, and the ionic strength between 0.05 and 0.2, and separating from the resulting liquid system a protein which is insoluble therein.

8. In a method for fractionating proteins, the steps which comprise adding to a solution containing a mixture of proteins, both an electrolyte and an organic precipitant for protein, the electrolyte being added in amount sufficient to bring the ionic strength to between 0.01 and 0.2 and the precipitant being added in amount such as to cause precipitation of only the desired protein fraction, adjusting and maintaining the pH of said solution between 4.4 and 7 and the temperature thereof between 0 and −15° C. and thereby precipitating a protein from the resulting system.

9. The method of purifying and crystallizing albumin, which comprises dissolving impure albumin in an alcohol solution containing from 15 to 40% alcohol, at a pH of approximately 5.5 to 6.0, an ionic strength of 0.05 to 0.5 and at a temperature of 0° C. to −5° C., and maintaining said solution within said temperature range until a purified albumin crystallizes out.

10. As a new product, an aqueous albumin solution containing at least 25% by volume of albumin and suitable for intravenous injection, which solution remains stable without precipitation of the albumin after exposure to a temperature of 45° C. for a period of one month.

11. The method of fractionating substances which have differing solubilities, all of said substances being prevented from passing through a semi-permeable membrane, which comprises diffusing an organic precipitant through a semi-permeable membrane into a solution of a mixture of said substances, at a controlled temperature and hydrogen ion concentration, removing the precipitate thus formed and precipitating a plurality of successive fractions of said substances by variation in one or more of said factors.

12. The method of preventing denaturation of proteins by modifying reagents which would normally result in denaturation, which comprises adding the reagents to a protein solution by diffusion through a semi-permeable membrane.

13. The method of crystallizing albumin from a protein solution which includes diffusing alcohol through a semi-permeable membrane into such solution, under conditions of controlled hydrogen ion concentration, temperature and ionic strength, to cause separation of albumin crystals therefrom.

14. In a method for fractionating proteins, the steps which comprise diffusing an organic precipitant through a semi-permeable membrane into a solution of proteins, controlling the amount of said precipitant in the solution, the temperature, the hydrogen ion concentration and the ionic strength, separating the resulting precipitate from the protein solution, and separating successive protein fractions by varying a plurality of said factors affecting solubility thereof.

15. In a method for fractionating proteins, the step which comprises diffusing alcohol through a semi-permeable membrane into a solution of proteins, at a temperature below 0° C.

16. In a method for fractionating proteins, the step which comprises diffusing alcohol through a Cellophane membrane into a protein solution, at a temperature not exceeding 0° C.

17. The method of fractionating proteins which comprises diffusing into a protein solution, through a Cellophane membrane, a precipitant comprising alcohol and a buffer, until equilibrium is reached on both sides of said membrane with regard to the alcohol and the buffer.

18. The method of fractionating proteins from blood plasma which involves cooling said plasma to a temperature in the neighborhood of 0° C. or lower, diffusing alcohol through a semi-permeable membrane into said plasma, while maintained at said temperature, separating the resulting protein precipitate, dialyzing additional alcohol into the remaining solution, removing the resulting precipitate, reducing the temperature of the plasma and separating subsequent protein fractions by dialyzing further amounts of alcohol into said plasma.

19. The method of fractionating proteins which comprises separating a protein solution and an organic precipitant therefor by a semi-permeable membrane which is permeable to the precipitant but not to the protein, diffusing the precipitant through the membrane into the protein solution under conditions of controlled hydrogen ion concentration, temperature and ionic strength, and agitating the protein solution at the interface to prevent any local excess of the precipitant.

20. The method of fractionating proteins from blood which comprises as steps removing the corpuscles from the blood by centrifugation while preventing clotting of the fibrinogen by the addition of an anti-clotting agent, then precipitating a protein from the remaining plasma by diffusing an organic precipitant through a semi-permeable membrane into the said plasma, and by adjustment of the hydrogen ion concentration, the temperature and the ionic strength of the plasma, then drying the precipitate so obtained.

21. In a method for fractionating proteins contained in blood, the steps which comprise separating the corpuscles from the blood, treating the remaining plasma for the separation therefrom of a series of different proteins by systematic variation of the hydrogen ion concentration, the temeprature, the ionic strength and the alcohol content of the plasma, said separation involving diffusion of alcohol into the plasma through a semi-permeable membrane.

22. The method of fractionating proteins from blood plasma which comprises as steps precipitating a plurality of different protein fractions from the plasma by diffusing alcohol into the plasma through a semi-permeable membrane and by varying the temperature of said plasma, the temperature being progressively lowered and the alcohol concentration of the plasma being increased, with the precipitation of successive protein fractions, the temperature and the percentage of alcohol being so correlated that the temperature employed for the precipitation of any given protein fraction is close to but above the freezing point of the plasma at the percentage of alcohol present therein.

EDWIN J. COHN.

CERTIFICATE OF CORRECTION.

Patent No. 2,390,074.                                December 4, 1945.
                         EDWIN J. COHN.

It is hereby certified that error appears in the printed specification of the above numbered patent requiring correction as follows: Page 4, second column, line 9, for "stream" read --stem--; and page 6, second column, line 45, claim 21, for "temeprature" read --temperature--; and that the said Letters Patent should be read with this correction therein that the same may conform to the record of the case in the Patent Office.

Signed and sealed this 26th day of February, A. D. 1946.

Leslie Frazer (Seal)                          First Assistant Commissioner of Patents.